(12) United States Patent
Furutani

(10) Patent No.: US 12,009,016 B2
(45) Date of Patent: Jun. 11, 2024

(54) MAGNETIC HEAD AND MAGNETIC DISK DEVICE COMPRISING THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Kazuhiro Furutani, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/180,451

(22) Filed: Mar. 8, 2023

(65) Prior Publication Data
US 2023/0377603 A1 Nov. 23, 2023

(30) Foreign Application Priority Data
May 20, 2022 (JP) .................... 2022-083017

(51) Int. Cl.
*G11B 5/187* (2006.01)
*G11B 5/255* (2006.01)
(52) U.S. Cl.
CPC ............ *G11B 5/1871* (2013.01); *G11B 5/255* (2013.01)
(58) Field of Classification Search
None
See application file for complete search history.

(56) References Cited

U.S. PATENT DOCUMENTS

| | | | |
|---|---|---|---|
| 6,233,118 B1 | 5/2001 | Boutaghou et al. | |
| 7,106,556 B2 * | 9/2006 | Pendray | G11B 5/6005 |
| 8,139,323 B2 * | 3/2012 | Huha | G11B 5/6082 |
| | | | 428/815.1 |
| 8,184,405 B1 * | 5/2012 | Zheng | G11B 5/6082 |
| | | | 360/266.3 |
| 8,199,437 B1 * | 6/2012 | Sun | G11B 5/6082 |
| | | | 360/236.3 |
| 8,810,967 B2 * | 8/2014 | Ramakrishnan | G11B 5/6082 |
| | | | 360/235.5 |
| 9,093,098 B2 * | 7/2015 | Rajasekharan | G11B 5/6005 |
| 9,431,044 B1 * | 8/2016 | Sun | G11B 5/1871 |
| 9,911,444 B1 * | 3/2018 | Yamane | G11B 5/6082 |

(Continued)

FOREIGN PATENT DOCUMENTS

JP 2012234590 A * 11/2012 ........... G11B 5/6082

*Primary Examiner* — William J Klimowicz
(74) *Attorney, Agent, or Firm* — Knobbe, Martens, Olson & Bear, LLP

(57) ABSTRACT

According to one embodiment, a magnetic head includes a slider including an air bearing surface which includes a plurality of uppermost surfaces each constituting a pressure generating surface and a plurality of other surfaces different in height from the uppermost surfaces, an inflow end, and an outflow end, and a head portion provided at the outflow end. The air bearing surface includes a negative pressure generating groove, a leading pad having the uppermost surface, and a trailing pad having the uppermost surface. The uppermost surface in a region between a tip portion of the trailing pad and the outflow end includes only the trailing pad.

10 Claims, 7 Drawing Sheets

(56) References Cited

U.S. PATENT DOCUMENTS

| | | | |
|---|---|---|---|
| 9,940,960 B2* | 4/2018 | Cha | G11B 5/6082 |
| 10,249,334 B1 | 4/2019 | Hu et al. | |
| 10,665,258 B2* | 5/2020 | Yamane | G11B 5/6082 |
| 10,811,046 B2* | 10/2020 | Pan | G11B 5/6082 |
| 10,984,828 B1* | 4/2021 | Huang | G11B 5/4826 |
| 11,114,121 B2 | 9/2021 | Pan et al. | |
| 2008/0144221 A1* | 6/2008 | Hanyu | G11B 5/6082 |
| 2012/0134055 A1* | 5/2012 | Tsuda | G11B 5/6082 |
| | | | 360/235.5 |
| 2012/0275063 A1* | 11/2012 | Sonoda | G11B 5/6082 |
| | | | 360/236.5 |
| 2019/0259420 A1* | 8/2019 | Furutani | G11B 5/6082 |
| 2019/0267038 A1* | 8/2019 | Higashiya | G11B 5/40 |
| 2020/0020355 A1* | 1/2020 | Pan | G11B 21/21 |
| 2020/0090692 A1* | 3/2020 | Yamane | G11B 5/6082 |
| 2020/0090693 A1* | 3/2020 | Yamane | G11B 5/6082 |

* cited by examiner

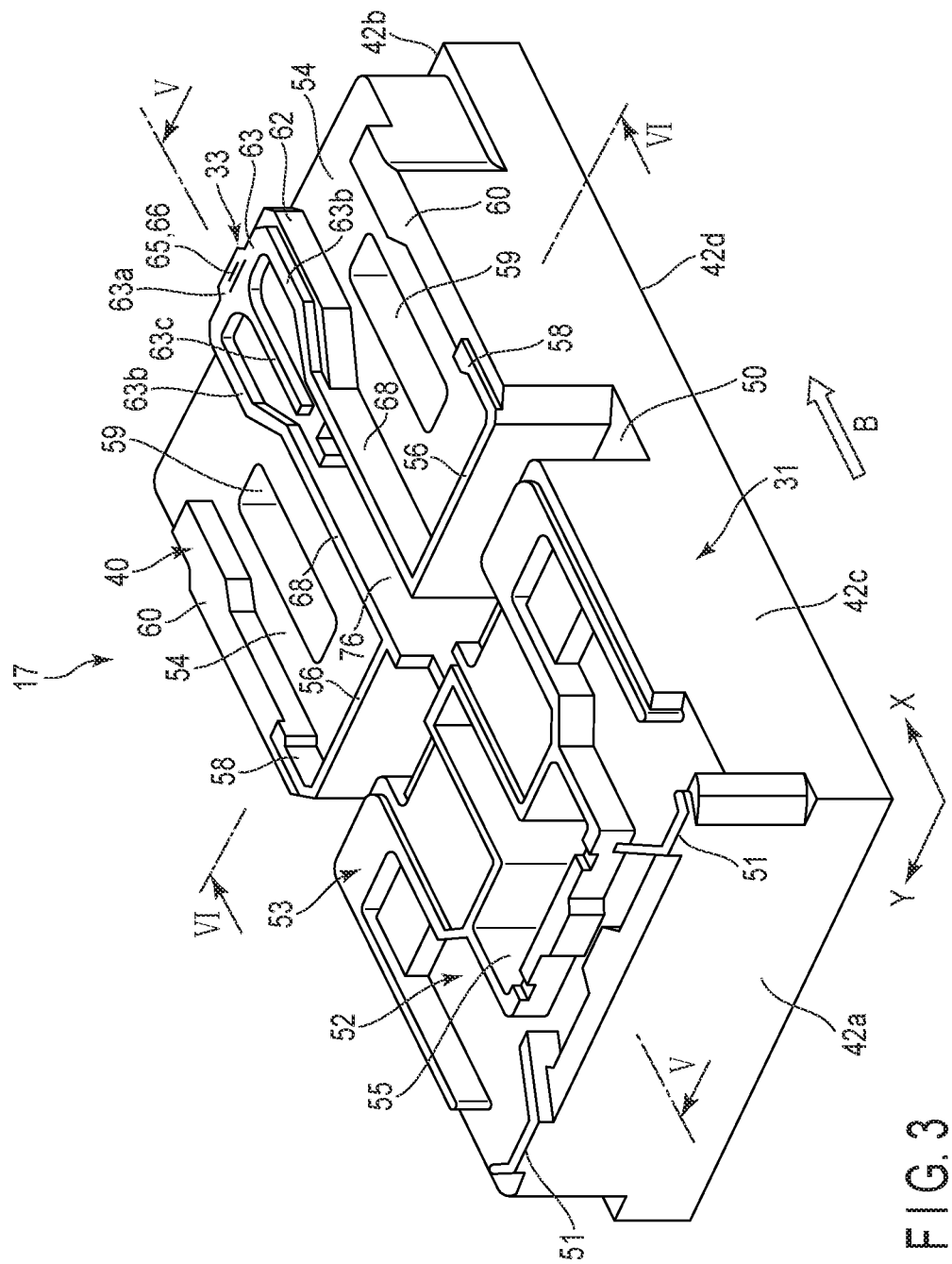
F I G. 3

MAGNETIC HEAD AND MAGNETIC DISK DEVICE COMPRISING THE SAME

CROSS-REFERENCE TO RELATED APPLICATIONS

This application is based upon and claims the benefit of priority from Japanese Patent Application No. 2022-083017, filed May 20, 2022, the entire contents of which are incorporated herein by reference.

FIELD

Embodiments described herein relate generally to a magnetic head and a magnetic disk device comprising the same.

BACKGROUND

As a magnetic disk device, for example, a hard disk drive (HDD) comprises a magnetic disk provided to be freely rotatable and a magnetic head that performs recording data to and reading data from the magnetic disk. The magnetic head comprises a slider (head slider) and a head unit provided on the slider. A head unit includes a read reproducing element and a write recording element. The slider has an opposed surface (air bearing surface [ABS]) which is opposed to a surface of the magnetic disk.

During the operation of the HDD, a force (positive pressure) to cause the slider to fly from the magnetic disk surface acts on the ABS of the slider by the airflow generated between the rotating magnetic disk and the slider. The slider flies with a certain gap between the magnetic disk surface and the slider by balancing the flying force with the head load. In this case, the gap on the inflow side of the ABS, which is defined as the amount of fly, is larger than the amount of fly at the outflow end of the ABS. In other words, the gap between the ABS and the magnetic disk becomes narrower from the inflow end to the outflow end.

In addition, an uneven portion is provided on the ABS of the slider to adjust the gap between the head portion mounted on the outflow end side of the slider and the magnetic disk to a desired amount. An uppermost surface of the ABS, i.e., a surface closest to the magnetic disk surface, of the ABS, is the positive pressure generating surface used primarily to generate the flying force. The generated pressure can be increased and the gap between the magnetic head and the magnetic disk surface can be kept stable by reducing the distance between the uppermost surface and the magnetic disk surface.

In recent years, as HDDs have become larger in capacity, the amount of fly (gap) of the magnetic head has been set much smaller to increase the recording density.

The interior of the HDD is maintained at a high cleanliness, but a small quantity of contamination such as dust and dirt exists. If contamination attached to the surface of the magnetic disk enters the gap between the magnetic disk surface and the ABS of the slider, the contamination may become trapped where the gap is smaller than the grain size of the contamination and, consequently, scratches may be generated on the magnetic disk surface. As described above, in recent years, since the amount of fly of the magnetic head is set to be small to increase recording density, for example, very small contamination having a grain size of 60 to 100 nm may also be trapped in the above-described gap, which needs to be reduced.

BRIEF DESCRIPTION OF THE DRAWINGS

FIG. 3 is a perspective view showing the magnetic head from an air bearing surface (ABS) side.

DETAILED DESCRIPTION

Figure 1:
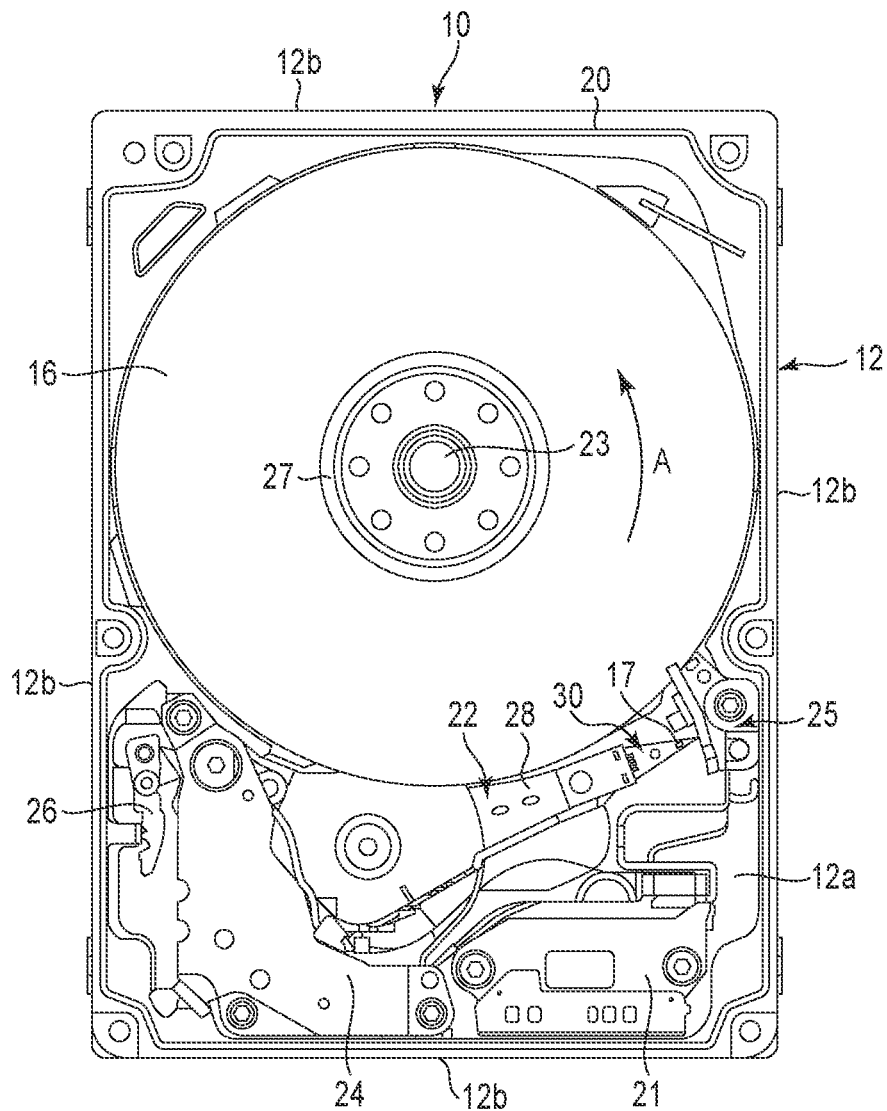
FIG. 1 is a plan view showing an internal structure of a hard disk drive (HDD) according to an embodiment.

A magnetic disk device according to the embodiments will be described hereinafter with reference to the accompanying drawings. In general, according to one embodiment, a magnetic head comprises a slider including an air bearing surface which includes a plurality of uppermost surfaces each constituting a pressure generating surface and a plurality of other surfaces different in height from the uppermost surfaces, an inflow end, and an outflow end spaced apart from the inflow end in a first direction; and a head portion provided at the outflow end of the slider to read and write data. The air bearing surface includes a negative pressure generating groove formed at a central portion in the first direction and extending in a second direction orthogonal to the first direction, a leading pad provided in a region between the central portion and the inflow end and having the uppermost surface, a trailing pad provided adjacent to the outflow end in a region between the central portion and the outflow end and having the uppermost surface, and an other uppermost surface provided in a region between a tip portion on the inflow end side of the trailing pad and the central portion. The uppermost surface provided in the region between the tip portion of the trailing pad and the outflow end includes only the trailing pad.

The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

Embodiments

A hard disk drive (HDD) according to one of embodiments will be described in detail as an example of a magnetic disk device. FIG. 1 shows an internal structure of the HDD according to the embodiment.

As shown in FIG. 1, the HDD comprises a housing 10. The housing 10 comprises a base 12 formed in the shape of a rectangular box which is open on its upper side, and a top cover (not shown) to cover an upper opening of the base 12. The base 12 comprises a rectangular bottom wall 12a and sidewalls 12b standing along the edges of the bottom wall 12a.

The housing 10 contains one or more magnetic disks 16 serving as recording media, and a spindle motor 23 serving as a driving unit which supports and rotates the magnetic disks 16. The magnetic disks 16 are engaged coaxially with a hub (not shown) of the spindle motor 23, clamped by a clamp spring 27, and thereby fixed to the hub. The magnetic disks 16 are rotated at a predetermined speed in a direction of arrow A by the spindle motor 23.

A plurality of magnetic heads 17 that write data to and read data from the magnetic disks 16 and a carriage assembly 22 that supports these magnetic heads 17 movably with respect to the magnetic disks 16 are provided in the housing 10. Further, the housing 10 accommodates a voice coil motor (VCM) 24 that rotates and positions the carriage assembly 22, a ramp load mechanism 25 that holds the magnetic heads 17 in unloaded positions remote from the magnetic disks 16 when the magnetic heads 17 travel to the outermost circumference of the disks 16, a latch mechanism 26 that holds the carriage assembly 22 in a retracted position when impulse or the like acts on the HDD, and a substrate unit 21 including a conversion connector and the like.

A printed circuit board (not shown) is screwed to an outer surface of the bottom wall 12a of the base 12. The printed circuit board controls the operation of the spindle motor 23, and also controls the operations of the VCM 24 and the magnetic heads 17 via the board unit 21.

Figure 2:
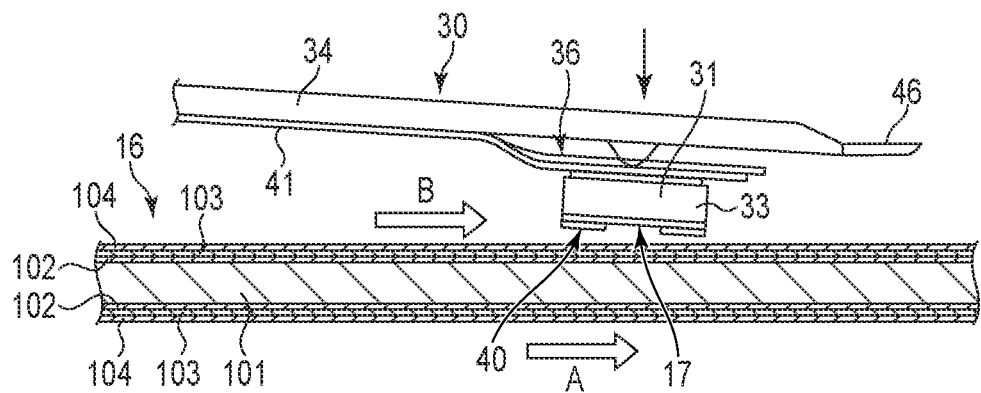
FIG. 2 is an enlarged side view showing a magnetic disk, a magnetic head, and a suspension in the HDD.

FIG. 2 is a side view schematically showing the magnetic head in a flying state and the magnetic disks. As shown in FIG. 1 and FIG. 2, the magnetic disk 16 comprises, for example, a substrate 101 formed of a nonmagnetic substance in a shape of a disk having a diameter of approximately 95 mm (3.5 inches). A soft magnetic layer 102 formed of a material having a soft magnetic characteristic as a base layer, a magnetic recording layer 103 serving as an upper layer portion thereof, and a protective film layer 104 serving as an upper layer portion thereof, are stacked in this order on both surfaces of the substrate 101.

The carriage assembly 22 includes a plurality of arms 28, and head gimbal assemblies 30 extending from the respective arms 28. Each of the head gimbal assemblies 30 includes a suspension 34 shaped in an elongated leaf spring, a flexure 41 provided on the suspension 34 as a wiring member, and a magnetic head 17. The magnetic head 17 is supported on a distal end portion of the suspension 34 via a gimbal portion 36 of the flexure 41.

As shown in FIG. 2, the magnetic head 17 is configured as a flying type head, and comprises a slider 31 formed in a substantially rectangular parallelepiped shape and a head portion 33 formed at an end portion on an outflow end (trailing) side of the slider 31. The slider 31 has an air bearing surface (ABS) 40 opposed to the surface of the magnetic disk 16. The magnetic head 17 flies by airflow B which is generated between a surface of the magnetic disk 16 and the ABS 40 of the slider 31 by the rotation of the magnetic disk 16. The direction of the airflow B coincides with the direction of rotation A of the magnetic disk 16.

Figure 4:
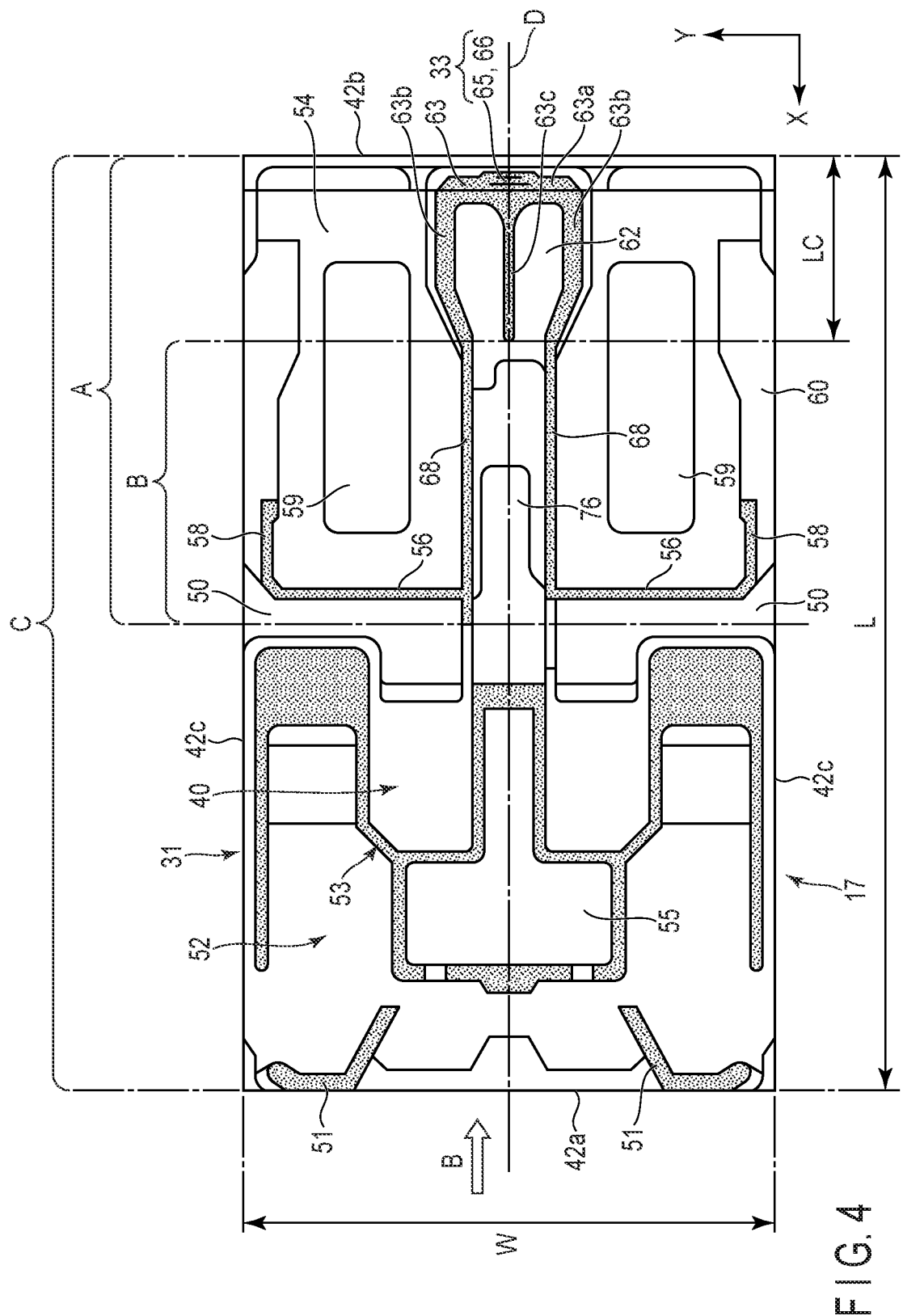
FIG. 4 is a plan view showing the magnetic head from an air bearing surface (ABS) side.

Next, the configuration of the magnetic head 17 will be described in detail. FIG. 3 is a perspective view showing the slider of the magnetic head. FIG. 4 is a plan view showing the slider on the ABS side.

As shown in FIG. 3 and FIG. 4, the slider 31 of the magnetic head 17 is formed in a substantially rectangular parallelepiped shape, and has a rectangular air bearing surface (disk opposed surface) (ABS) 40 opposed to the surface of the magnetic disk 16, a rectangular back surface 42d opposed to the ABS 40, an inflow end surface (leading end surface or inflow end) 42a extending orthogonally to the ABS 40, an outflow end surface (trailing end surface or outflow end) 42b extending orthogonally to the ABS 40, and a pair of side surfaces 42c each extending between inflow end surface 42a and the outflow end surface 42b orthogonally to the ABS 40. In the slider 31, the back surface 42d located on a side opposed to the ABS 40 is secured to the gimbal portion.

The longitudinal direction of the ABS 40 is referred to as a first direction X, and the width direction orthogonal thereto is referred to as a second direction Y. In one example, the slider 31 is formed with a length L in the first direction X of 1.25 mm or less, for example, 1.235 mm, a width W in the second direction Y of 1.0 mm or less, for example, 0.7 mm, and a thickness T1 of 0.23 to 0.3 mm, and is constructed as a so-called pemto slider.

Figure 5:
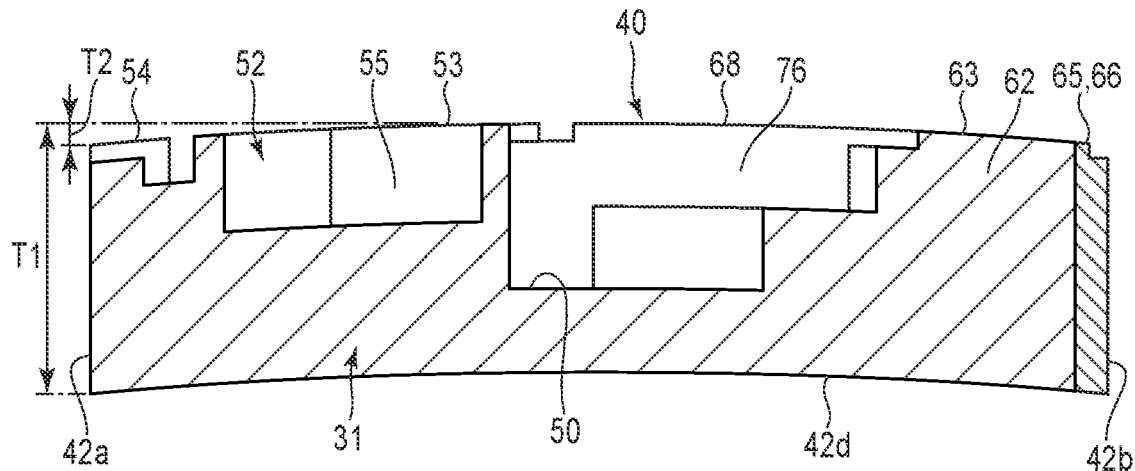
FIG. 5 is a cross-sectional view showing the magnetic head taken along line V-V of FIG. 3.
Figure 6:
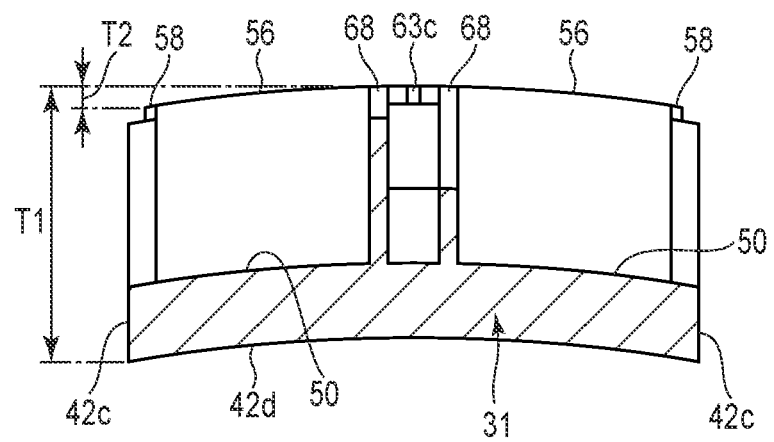
FIG. 6 is a cross-sectional view showing the magnetic head taken along line VI-VI of FIG. 3.

FIG. 5 is a longitudinal cross-sectional view of the slider taken along line V-V of FIG. 3. FIG. 6 is a cross-sectional view showing the slider taken along line VI-VI of FIG. 3. As shown in the figures, the upper surface (ABS 40) of the slider 31 is curved in a convex arc shape in the first direction X, forming a so-called crown. In addition, the ABS 40 is curved in a convex arc shape in the second direction Y, forming a so-called camber. Height T2 of a central portion of the crown and the camber is formed to be approximately 15 nm in one example.

As shown in FIG. 3 to FIG. 5, a band-shaped deep groove (negative pressure generating groove) 50 is formed at a substantially central portion in the first direction X of the ABS 40. The deep groove 50 extends over the entire length of the slider 31 in the second direction Y and is opened on both side surfaces 42c of the slider 31. When the thickness T1 of the slider 31 is set to, for example, 0.23 mm, the depth of the deep groove 50 is formed to be 1 to 5 μm, for example, 3 μm. The negative pressure can be generated on the leading side of the deep groove 50 at all yaw angles realized by the HDD, by providing the deep groove 50.

A leading step 52 in a substantially rectangular shape is formed at the leading end portion of the ABS 40. The leading step 52 is provided to protrude toward the upper surface with respect to the bottom surface of the deep groove 50 and is located on the inflow side of the deep groove 50 relative to the airflow B.

To maintain the pitch angle of the magnetic head 17, a leading pad 53 which supports the slider 31 by an air film is provided on the leading step 52 to protrude therefrom. The upper surface of the leading pad 53 forms the pressure generating surface on the inflow side, i.e., the uppermost surface. The leading pad 53 is formed in an M-letter shape with a plurality of portions opened toward the inflow side. A leading groove 55 is formed at a substantially central portion of the leading step 52 in the second direction Y. The leading groove 55 has, for example, a T-letter shape and is formed in bilateral symmetry with respect to a central axis D of the slider 31. In the embodiment, a pair of end pads 51 are further provided on the leading step 52. The pair of end pads 51 extend from the inflow end of the slider 31 toward the outflow side, and toward the side of the central axis D to the vicinity of the leading pad 53.

The upper surface of the leading pad 53 and the upper surface of the end pad 51 are the uppermost surface of the slider 31 and constitute the main pressure (positive pressure) generating surfaces on the inflow side of the ABS 40. In FIG. 4, the uppermost surface of the ABS 40 is represented with dots added.

As shown in FIG. 3 to FIG. 5, a negative pressure cavity 54 formed of a recess is formed and extends from a substantially central portion of the ABS 40 in the first direction X to the outflow end surface 42*b*. The negative pressure cavity 54 is located on the outflow end side of the deep groove 50 and is opened toward the outflow end surface 42*b*. The negative pressure cavity 54 is formed to be shallower than the deep groove 50, i.e., formed at a position higher than the bottom surface of the deep groove 50. The depth of the negative pressure cavity 54 is in a range from 500 to 1,500 nm, for example, 1,000 nm. A pair of trailing grooves 59 are formed on the bottom surface of the negative pressure cavity 54. The pair of trailing grooves 59 are located on both sides of the central axis D, each extending in the first direction X. The trailing grooves 59 have the same depth as the deep groove 50. A negative pressure can be generated at all yaw angles realized by the HDD by providing the negative pressure cavity 54 and the trailing grooves 59.

A rib-shaped intermediate cross rail 56, a pair of side rails 58, and a pair of center rails 68 are formed to surround the inflow side of the negative pressure cavity 54 in the ABS 40. The intermediate cross rail 56 is located between the deep groove 50 and the negative pressure cavity 54 and extends between both the side edges of the ABS 40 in the second direction Y. The intermediate cross rail 56 is provided to protrude against the bottom surface of the negative pressure cavity 54 and is located on the inflow side of the negative pressure cavity 54 relative to the airflow B.

The pair of side rails 58 are formed along the respective side edges of ABS 40 and extend linearly from the intermediate cross rail 56 to the outflow end side of the ABS 40. These side rails 58 protrude with respect to the bottom surface of the negative pressure cavity 54. The upper surface of the intermediate cross rail 56 and the upper surface of the side rails 58 constitute the uppermost surface (main pressure generating surface) of the ABS 40.

A pair of skirts 60 are provided along respective side edges (side surfaces 42*c*) of the ABS 40 and extend from the side rails 58 to the vicinity of the outflow end surface 42*b* of the ABS 40 in the first direction X. Each of the skirts 60 is provided to protrude with respect to the bottom surface of the negative pressure cavity 54 and is formed to be lower than the side rails 58.

The intermediate cross rail 56, the pair of side rails 58, and the pair of skirts 60 are closed on the upstream side and are formed in a substantially U-letter shape opened toward the downstream side, as a whole. The negative pressure cavity 54 is defined by the intermediate cross rail 56, the pair of side rails 58, and the pair of skirts 60.

As shown in FIG. 3 to FIG. 6, the slider 31 includes a trailing step 62 formed on the outflow end side of the ABS 40 with respect to the direction of the airflow B. The trailing step 62 is formed to protrude against the bottom surface of the negative pressure cavity 54, and its protrusion is formed to have substantially the same height as the leading step 52. The trailing step 62 is located at a substantially central portion of the ABS 40 in the second direction Y. A trailing pad (pressure generating surface on the outflow side) 63 which supports the slider 31 by means of an air film is provided on the trailing step 62 to protrude there from.

The trailing pad 63 includes a base portion 63*a*, and a pair of side pads 63*b* and a center pad 63*c* extending from the base portion 63*a*. The base portion 63*a* extends in the second direction Y and is provided with a gap on the inflow side from the outflow end surface of the trailing step 62 or, in this case, the outflow end surface 42*b* of the slider 31. The pair of side pads 63*b* are elongated ribs and extend from both end portions of the base 63*a* toward the leading side in the first direction X. The center pad 63*c* is an elongated rib, located on the central axis D, and extends from the base 63*a* toward the leading side in the first direction X. As shown in FIG. 4, in one example, a length LC between the extended end of the center pad 63*c* and the outflow end surface 42*b* is set to be approximately ¼ or less of the total length L in the first direction X of the slider 31.

The trailing pad 63 is formed at the same height level as the leading pad 53, the intermediate cross rail 56, and the side rails 58, and the upper surface of the trailing pad 63 constitutes the uppermost surface (main pressure generating surface) of the ABS 40.

The head portion 33 of the magnetic head 17 includes a recording element 65 and a reproducing element 66 that record and reproduce information on the magnetic disk 16. The recording element 65 and the reproducing element 66 are embedded within the outflow end portion of the slider 31 with respect to the direction of the airflow B or, in this case, within the trailing step 62. The recording element 65 and the reproducing element 66 are exposed to the upper surface of the ABS 40 at the position of the trailing pad 63.

A pair of elongated center rails 68 extend from the intermediate cross rail 56 to the trailing step 62 in the first direction X. The pair of center rails 68 are located on both sides of the central axis D of the slider 31 and are opposed to each other with a gap interposed in the second direction Y. The center rails 68 are provided in a region between the deep groove 50 and the trailing step 62 and in a central region between the pair of side edges of the slider 31 (central portion of the second direction Y). One of the center rails 68 extends into the deep groove 50 beyond the intermediate cross rail 56. The center rail 68 is formed to have the same height from the bottom surface of the negative pressure cavity 54 as the height of the intermediate cross rail 56 and the trailing pad 63. An upper surface of the center rail 68 constitutes the uppermost surface of the slider 31.

A guide groove 76 for guiding an airflow to the trailing step 62 and the trailing pad 63 is formed between the pair of center rails 68. The guide groove 76 is formed along the center axis D and extends further to the leading step 52 through the deep groove 50.

The concave and convex structure of the ABS 40 constructed as described above is obtained by milling a predetermined portion of the upper surface (uppermost surface, ABS 40) of the slider 31 and forming grooves, cavities, and steps.

Next, verification results on the occurrence of scratches caused by the contamination (particles) that are bitten into the gap between the magnetic head and the magnetic disk as described above will be described.

Figure 7:
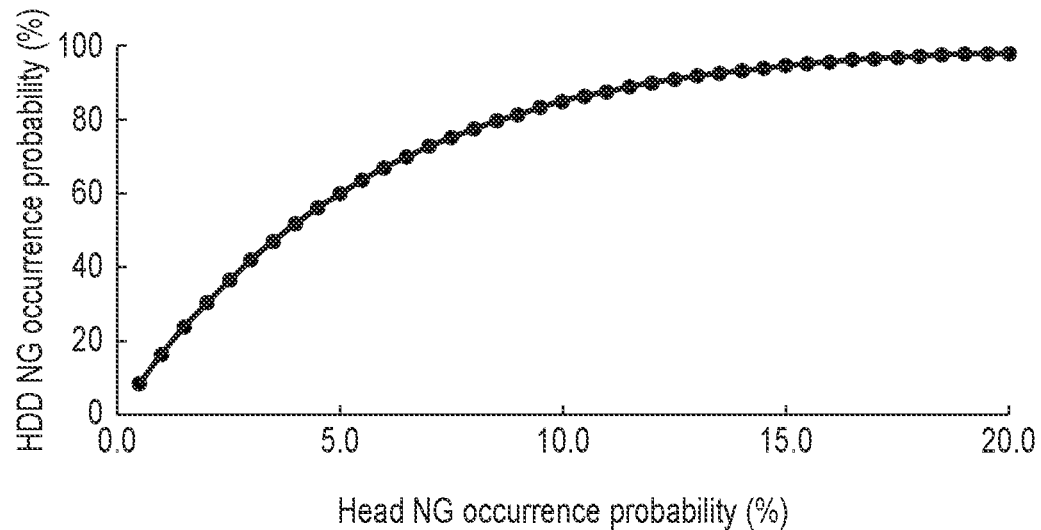
FIG. 7 is a graph showing a relationship between the NG probability of the magnetic head and the NG probability of the HDD.

In injecting contamination having a particle size of 60 to 100 nm into HDD and verifying a relationship between the NG occurrence probability of the HDD and the NG occurrence probability of the mounted magnetic head, a relationship as shown in FIG. 7 has been found. In FIG. 7, a horizontal axis indicates the NG occurrence probability of the magnetic head, and a vertical axis indicates a survival rate of the HDD (NG occurrence probability). The survival rate of the HDD indicates that no NG occurs in all mounted magnetic heads. The test is generally conducted at NG occurrence acceleration of approximately 200 times.

As shown in FIG. 7, the HDD survival probability becomes lower as the NG occurrence probability per magnetic head is higher. Therefore, a flying surface (ABS) by which the NG occurrence probability per magnetic head is lowered needs to be designed.

The gap between the uppermost surface and the magnetic disk surface in the ABS 40 of the slider 31 is 100 nm or less in region B between the central portion of the ABS 40 in the first direction X and the outflow end surface. For this reason, it can easily be imagined that the contamination having a grain size of 60 to 100 nm is trapped between the uppermost surface and the magnetic disk surface in the region B.

Figure 8:
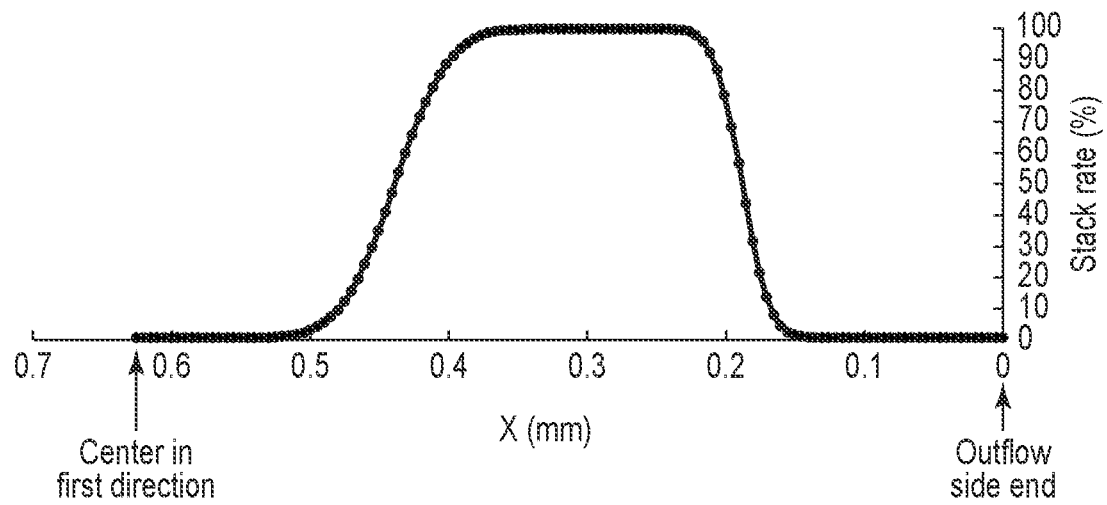
FIG. 8 is a graph showing a particle push-in probability at the longitudinal position of the ABS.

FIG. 8 shows results of obtaining the probability of the contamination bitten in the gap between the uppermost surface and the magnetic disk surface (bite probability: stack rate) according to the position of the ABS 40 in the first direction X. In the calculation of the above probabilities, it is assumed that the ABS 40 is formed by a flat surface having no unevenness. It can be understood from the results that as regards the contamination having a grain size of 60 to 100 nm, the contamination pushing probability is high in a part of region A, especially region C between the central portion of the first direction X and the outflow end (for example, the range of 0.15 to 0.5 mm), which contributes to scratches on the magnetic disk surface. Therefore, the occurrence of scratches on the magnetic disk can be reduced by reducing the area of the uppermost surface in the region C.

Figure 9:
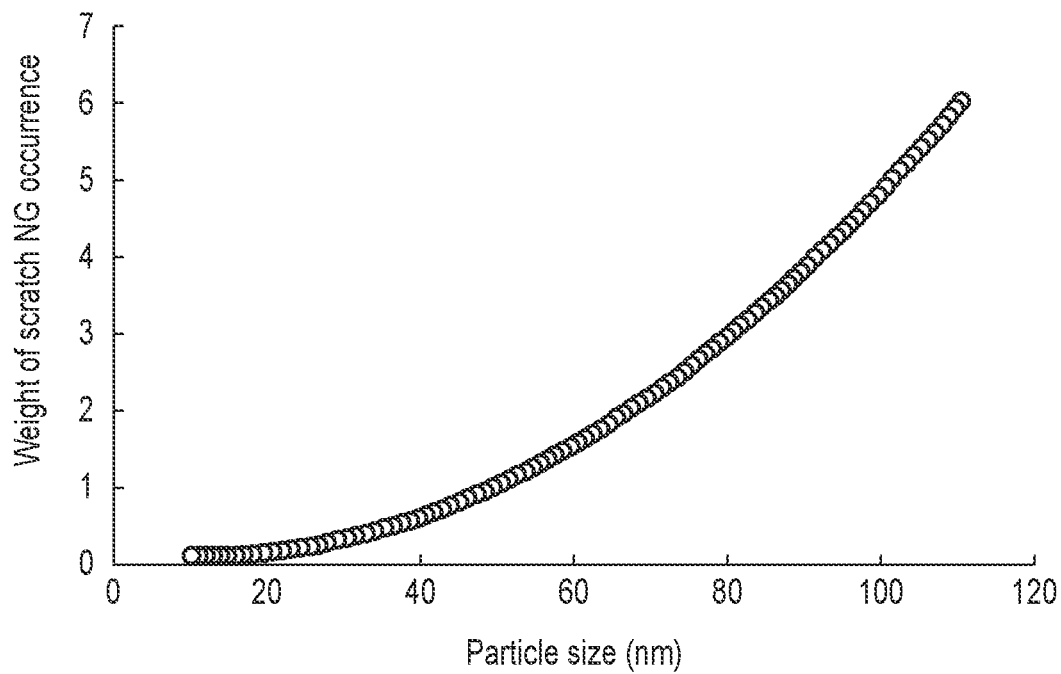
FIG. 9 is a graph showing a relationship between the particle size and the weight of scratch NG occurrence.

The affect of scratches on the magnetic disk increases quadratically as the grain size of the contamination increases. This is because the width and depth of the scratches are related to the NG of the magnetic disk device. FIG. 9 shows a relationship between the particle size of the contamination and the weight of scratch NG occurrence. The scratch occurrence rate on a magnetic disk can be obtained by (area of the uppermost surface in the region C of the ABS 40×bite probability×weight of scratch NG occurrence). The region C indicates the area between the central portion of the ABS 40 in the first direction X and a half position of the outflow end side.

In the HDD of the embodiment, the arrangement and the area of the uppermost surface of the ABS 40 are set based on the above-described verification results.

In other words, as shown in FIG. 4, in the magnetic head 17 of this embodiment, when the entire region over the entire length of the ABS 40 in the first direction X is referred to as region C, the region between the central portion of the first direction X and the outflow end surface 42b is referred to as region A, and the region between the central portion of the first direction X and the tip of the center pad 63c is referred to as region B, the area of the uppermost surface (surface at the same height as the main pressure generating surface) in the region A is set to be small. In contrast, the trailing pad 63 on which the head unit 33 is mounted has a gap of 60 nm or less with the magnetic disk surface, and the risk of scratch generation due to contamination is small. The trailing pad 63 is the uppermost surface in the ABS 40 that generates the highest positive pressure, and a certain area is necessary to stably ensure a gap between the head unit 33 and the magnetic disk. In addition, since the uppermost surface in the region A also contributes to negative pressure generation, its area cannot be reduced to zero. Based on these factors, the uppermost surface whose area can be reduced is the uppermost surface located in the region B.

Figure 10:
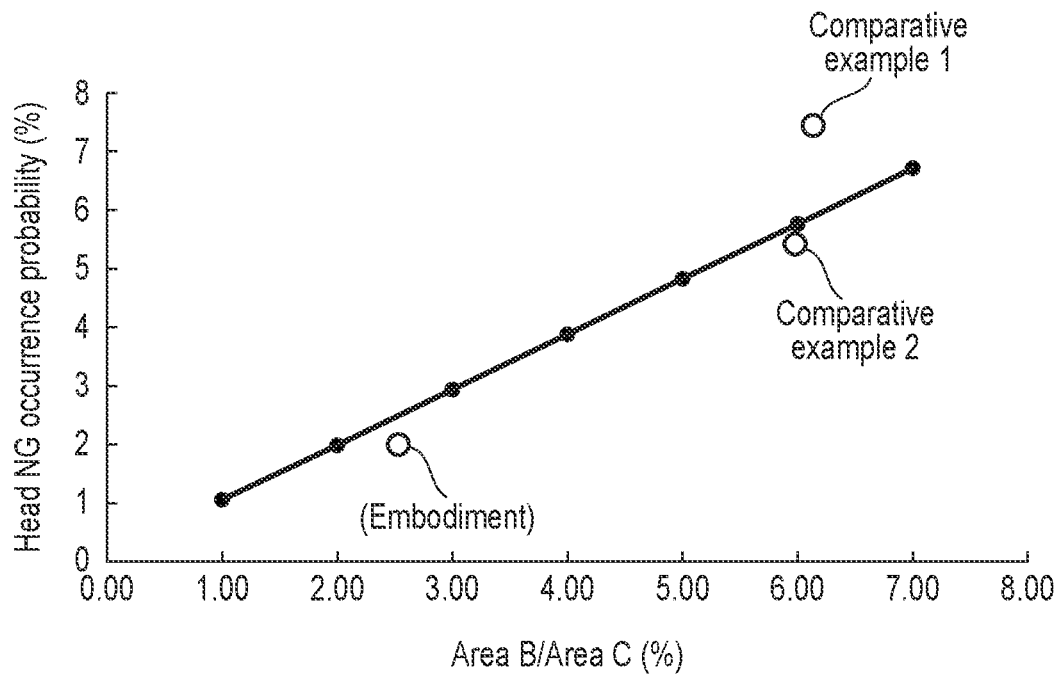
FIG. 10 is a graph showing a relationship between a rate of region B to region A of the ABS and the NG occurrence probability of the magnetic head.

FIG. 10 shows a relationship between a ratio of the total area of the uppermost surface located in the region C of the ABS 40 to the area of the uppermost surface located in the region B, and the head NG occurrence probability.

According to the embodiment, the ratio of the area of the uppermost surface located in the region B is set at approximately 2 to 3%. In Comparative Examples 1 and 2, the ratio of the area of the uppermost surface located in the region B is set at around 6%. It can be understood from FIG. 10 that the head NG occurrence probability is significantly reduced as compared to Comparative Examples 1 and 2, by reducing the ratio of the area of the uppermost surface in the embodiment.

Figure 11:
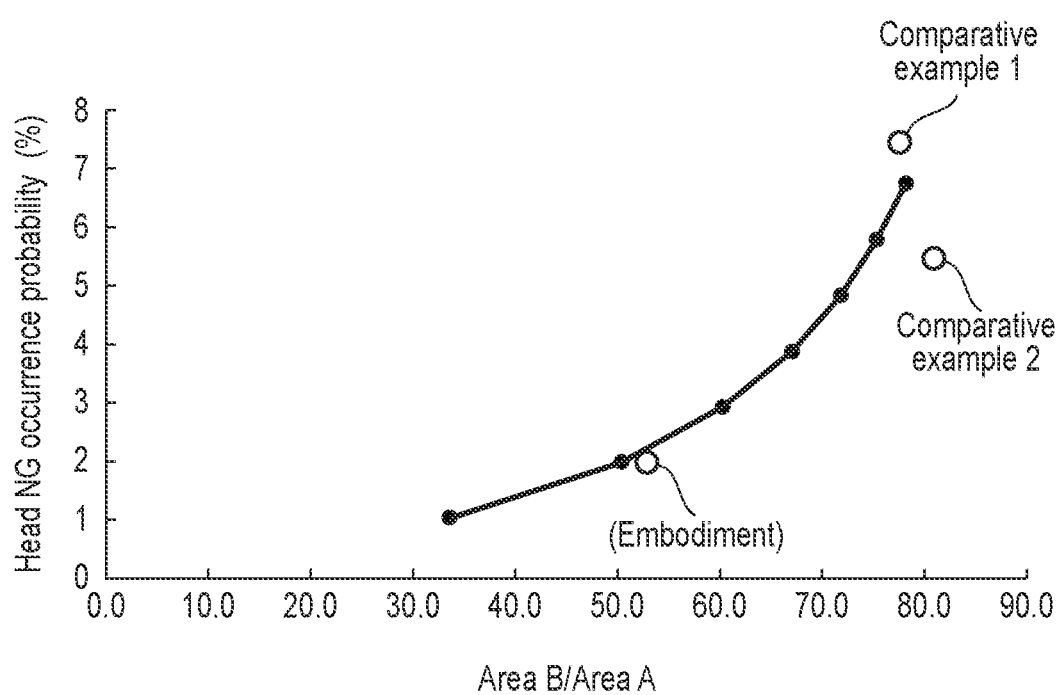
FIG. 11 is a graph showing a relationship between a ratio of region B to region C of the ABS and the NG occurrence probability of the magnetic head.

FIG. 11 shows a relationship between the ratio of the area of the uppermost surface located in the region B to the total area of the uppermost surface located in the region A of the ABS, and the head NG occurrence probability.

According to the embodiment, the ratio of the area of the uppermost surface located in the region B is set to 60% or less, for example, approximately 55%. In Comparative Examples 1 and 2, the ratio of the area of the uppermost surface located in the region B is set to around 80%. It can be understood from FIG. 11 that as the area ratio is decreased, the NG occurrence probability of the head decreases quadratically. It can be understood that by setting the ratio of the area of the uppermost surface in the region B to 60% or less in the embodiment, the head NG occurrence probability is significantly reduced as compared to Comparative Examples 1 and 2.

As described above, according to the embodiment, the percentage of the area of the uppermost surface located in the region B of the ABS 40 is set at 3% or less of the total area of the uppermost surface located in the region C and 60% or less of the total area of the uppermost surface provided in the region A.

Several or all uppermost surfaces of the ABS 40 are slightly curved to match the shape of the crown and camber of the slider 31, but these curved uppermost surfaces are also assumed to be included in the uppermost surface at the same height as the pressure generating surface.

As shown in FIG. 4, the uppermost surface in the region B includes the upper surfaces of the intermediate cross rail 56, the pair of side rails 58, and the pair of center rails 68. The width of each of the intermediate cross rail 56, the pair of side rails 58, and the pair of center rails 68 is set such that the area of the uppermost surface is 3% or less and 60% or less of the above percentage. Furthermore, to reduce the area of the uppermost surface, each of the side rails 58 extends linearly in the first direction X without being folded in the middle part. The length of the side rail 58 in the first direction X is set to be ½ or less of the length in the first direction X of the region B.

In the region A, the only trailing pad 63 is provided as the uppermost surface in the region on the downstream side (outflow end side) of the region B, and no other uppermost surface (surface at the same height as the pressure generating surface) is provided.

As described above, according to the magnetic head of the HDD of the embodiment, the slider 31 comprises the air bearing surface (ABS 40) which is opposed to the magnetic disk 16, the inflow end surface 42a, and the outflow end surface 42b, and the ABS 40 forms a concave and convex structure having a plurality of surfaces of different heights. The plurality of surfaces of the ABS 40 include the uppermost surface that is the main pressure generating surface. In the region closer to the outflow end side than the central portion in the first direction X of the ABS 40, the trailing pad 63 having the uppermost surface is provided near the outflow end, and the other uppermost surface is provided in the region between the inflow side end portion of the trailing pad 63 and the central portion. The region near the outflow end, i.e., the region between the inflow side tip of the trailing pad 63 and the outflow end surface 42b does not have the uppermost surface (pressure generating surface) other than the trailing pad 63.

The area of the uppermost surface provided in region B between the central portion in the first direction X of the ABS 40 and the inflow side end portion of the trailing pad 63 is set at 3% or less of the total area of the uppermost surface provided in the whole region C over the full length in the first direction X of the ABS 40. In addition, the area of the uppermost surface provided in the region B is set at 60% or less of the total area of the uppermost surface provided in the region A between the central portion in the first direction X and the outflow end surface 42b.

According to the magnetic head and the HDD configured as described above, the area of the uppermost surface in the region B between the central portion of the ABS 40 and the tip portion of the trailing pad can be reduced while maintaining the area of the trailing pad in which the head portion 33 is provided. Thus, biting the contamination in the gap between the ABS of the slider and the magnetic disk surface can be reduced, and failures and characteristic deterioration of the magnetic head and the magnetic disk which result from the contamination can be reduced. As a result, according to the embodiment, the magnetic head and the HDD improved in reliability can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the slider of the magnetic head is not limited to the pemto slider, but can also be applied to the pico slider, a femto slider, or a slider having larger dimensions. The shapes, dimensions, and the like of the trailing step, the trailing pad, and the other portions in the slider can be varied as needed. In the disk device, the magnetic disk is not limited to a 2.5-inch disk, but may be a magnetic disk of the other sizes. The number of magnetic disks is not limited to two, but may be one or three or more, and the number of magnetic heads may also be increased or decreased depending on the number of installed magnetic disks.

What is claimed is:

1. A magnetic head comprising:
a slider comprising an air bearing surface which includes a plurality of uppermost surfaces each constituting a pressure generating surface and a plurality of other surfaces different in height from the uppermost surfaces, an inflow end, and an outflow end spaced apart from the inflow end in a first direction; and
a head portion provided at the outflow end of the slider to read and write data,
the air bearing surface including a negative pressure generating groove formed at a central portion in the first direction and extending in a second direction orthogonal to the first direction, a leading pad provided in a region between the central portion and the inflow end and having the uppermost surface, a trailing pad provided adjacent to the outflow end in a region between the central portion and the outflow end and having the uppermost surface, and other uppermost surface provided in a region between a tip portion on the inflow end side of the trailing pad and the central portion,
the uppermost surface in the region between the tip portion of the trailing pad and the outflow end including only the trailing pad, wherein
the area of the uppermost surface provided in the region between the central portion of the air bearing surface and the inflow side end portion of the trailing pad is set at 3% or less of a total area of the uppermost surface provided in the whole region over a full length in the first direction of the air bearing surface.

2. A magnetic disk device comprising:
a disk-shaped recording medium provided to be rotatable; and
the magnetic head of claim 1 processing information for the recording medium.

3. A magnetic head comprising:
a slider comprising an air bearing surface which includes a plurality of uppermost surfaces each constituting a pressure generating surface and a plurality of other surfaces different in height from the uppermost surfaces, an inflow end, and an outflow end spaced apart from the inflow end in a first direction; and
a head portion provided at the outflow end of the slider to read and write data,
the air bearing surface including a negative pressure generating groove formed at a central portion in the first direction and extending in a second direction orthogonal to the first direction, a leading pad provided in a region between the central portion and the inflow end and having the uppermost surface, a trailing pad provided adjacent to the outflow end in a region between the central portion and the outflow end and having the uppermost surface, and other uppermost surface provided in a region between a tip portion on the inflow end side of the trailing pad and the central portion,
the uppermost surface in the region between the tip portion of the trailing pad and the outflow end including only the trailing pad, wherein
the area of the uppermost surface provided in the region between the central portion of the air bearing surface and the inflow side end portion of the trailing pad is set at 60% or less of a total area of the uppermost surface provided in the region between the central portion of the air bearing surface and the outflow end.

4. The magnetic head of claim 3, wherein
the slider comprises a cross rail extending in the second direction along the negative pressure generating groove, a pair of side rails extending linearly from the cross rail to the outflow end side, and a pair of center rails provided between the cross rail and the trailing pad, in the region between the central portion of the air bearing surface and the inflow side end portion of the trailing pad, and the uppermost surface includes an upper surface of the cross rail, upper surfaces of the side rails, and upper surfaces of the center rails.

5. The magnetic head of claim 4, wherein
the trailing pad includes a base portion adjacent to the outflow end, a pair of side pads each extending from the base portion to the inflow end side and connected to the center rail, and a center pad extending from the base portion to the inflow end side and located between the pair of side pads, and an extending end of the center pad constitutes the inflow side end portion of the trailing pad.

6. The magnetic head of claim 5, wherein
a length from the outflow end to the extending end of the center pad in the first direction is formed to be 1/5 to 1/4 of a length from the inflow end to the outflow end of the slider in the first direction.

7. A magnetic disk device comprising:
a disk-shaped recording medium provided to be rotatable; and
the magnetic head of claim 3 processing information for the recording medium.

8. The magnetic disk device of claim 7, wherein
the slider comprises a cross rail extending in the second direction along the negative pressure generating groove, a pair of side rails extending linearly from the cross rail to the outflow end side, and a pair of center rails provided between the cross rail and the trailing pad, in the region between the central portion of the air bearing surface and the inflow side end portion of the trailing pad, and the uppermost surface includes an upper surface of the cross rail, upper surfaces of the side rails, and upper surfaces of the center rails.

9. The magnetic disk device of claim 8, wherein
the trailing pad includes a base portion adjacent to the outflow end, a pair of side pads each extending from the base portion to the inflow end side and connected to the center rail, and a center pad extending from the base portion to the inflow end side and located between the pair of side pads, and an extending end of the center pad constitutes the inflow side end portion of the trailing pad.

10. The magnetic disk device of claim 9, wherein
a length from the outflow end to the extending end of the center pad in the first direction is formed to be 1/5 to 1/4 of a length from the inflow end to the outflow end of the slider in the first direction.

\* \* \* \* \*